United States Patent
Kim

(10) Patent No.: US 11,572,072 B2
(45) Date of Patent: Feb. 7, 2023

(54) APPARATUS AND METHOD FOR CONTROLLING AUTONOMOUS DRIVING

(71) Applicants: Hyundai Motor Company, Seoul (KR); Kia Motors Corporation, Seoul (KR)

(72) Inventor: Hee Gwon Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 55 days.

(21) Appl. No.: 16/866,967

(22) Filed: May 5, 2020

(65) Prior Publication Data

US 2021/0070308 A1    Mar. 11, 2021

(30) Foreign Application Priority Data

Sep. 9, 2019   (KR) .................... 10-2019-0111257

(51) Int. Cl.
    *B60W 40/09*    (2012.01)
    *B60W 60/00*    (2020.01)

(52) U.S. Cl.
    CPC ........ *B60W 40/09* (2013.01); *B60W 60/0053* (2020.02); *B60W 2510/182* (2013.01); *B60W 2520/105* (2013.01); *B60W 2520/125* (2013.01)

(58) Field of Classification Search
None
See application file for complete search history.

(56) References Cited

U.S. PATENT DOCUMENTS

| | | | | |
|---|---|---|---|---|
| 2016/0347181 | A1* | 12/2016 | Yamakado | B60L 15/2009 |
| 2017/0028991 | A1* | 2/2017 | Buzzetti | B60W 50/14 |
| 2019/0071078 | A1* | 3/2019 | Kallmeyer | B60W 40/107 |
| 2019/0071100 | A1* | 3/2019 | Xavier | B60W 30/10 |
| 2019/0113925 | A1* | 4/2019 | Sim | G05D 1/0278 |
| 2019/0143992 | A1* | 5/2019 | Sohn | B60W 30/16 701/23 |
| 2019/0184981 | A1* | 6/2019 | Jung | B60W 30/095 |
| 2019/0187706 | A1* | 6/2019 | Zhou | B60W 60/00 |
| 2020/0031371 | A1* | 1/2020 | Soliman | B60W 30/18 |
| 2020/0079396 | A1* | 3/2020 | Beaurepaire | G06F 11/3013 |
| 2020/0241523 | A1* | 7/2020 | Brandin | G05D 1/0022 |
| 2020/0398856 | A1* | 12/2020 | Giurgiu | G06K 9/00798 |
| 2020/0406894 | A1* | 12/2020 | Akella | G01S 13/865 |
| 2021/0107500 | A1* | 4/2021 | Kalabic | B60W 40/08 |
| 2021/0221397 | A1* | 7/2021 | Zhu | B60W 30/18009 |

FOREIGN PATENT DOCUMENTS

DE    102017215595 A1 *  3/2019  ........... B60W 40/08

\* cited by examiner

*Primary Examiner* — Jeff A Burke
*Assistant Examiner* — Jerrod Irvin Davis
(74) *Attorney, Agent, or Firm* — Fox Rothschild LLP

(57) ABSTRACT

A method of controlling autonomous driving is provided. The method includes collecting driving information of a driver and curvature information of a road and generating a driving pattern of the driver, defined by associating behaviors in longitudinal and lateral directions of the vehicle based on the driving information. The driving pattern is then set to a constraint condition for driving torque and brake pressure and the vehicle is operated based thereon.

15 Claims, 7 Drawing Sheets

APPARATUS AND METHOD FOR CONTROLLING AUTONOMOUS DRIVING

CROSS-REFERENCE TO RELATED APPLICATION(S)

This application claims the benefit of Korean Patent Application No. 10-2019-0111257, filed on Sep. 9, 2019, which is hereby incorporated by reference as if fully set forth herein.

BACKGROUND

Field of the Disclosure

The present disclosure relates to an apparatus and method for controlling autonomous driving, and more particularly to determining a quantitative driving pattern defined by associating motions in longitudinal and lateral directions of a vehicle based on a usual driving habit of the driver.

Discussion of the Related Art

Currently, a commercially available autonomous vehicle applies an advanced driver assistance system (ADAS) to alleviate requiring a driver to execute simple operations such as manipulation of a steering wheel and a pedal while the vehicle is being driven and also to prevent accidents due to inattentiveness of the driver, and thus has recently attracted increasing amount of attention. However, a general ADAS has not yet been combined with a dynamic factor indicating the overall longitudinal and lateral motion of a vehicle and facilitates autonomous driving based on uniform driving strategy, and thus there is a limit in quantitatively calculating a qualitative driving habit of a driver who 'toughly' (e.g., rapid, sudden movements) or 'smoothly' drives a vehicle.

In particular, when uniform autonomous driving is performed via dynamic calculation of a vehicle without consideration of association between motions and various driving habits of drivers while the vehicle travels on a curved road, the vehicle intermittently moves and a sense of unfamiliarity between actual driving and autonomous driving occurs from a driver point of view, and thus, a problem arises in terms of increased discomfort of a passenger who rides in the vehicle.

SUMMARY

An object of the present disclosure is to provide an apparatus and method for controlling autonomous driving for proposing a quantitative driving pattern defined by associating motions in longitudinal and lateral directions of a vehicle based on a usual driving habit of the driver to reduce a sense of unfamiliarity between autonomous driving and actual driving.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling autonomous driving may include collecting driving information of a driver and curvature information of a road, generating a driving pattern of the driver, defined by associating behaviors in longitudinal and lateral directions of the vehicle based on the driving information, and setting the driving pattern to a constraint condition for driving torque and brake pressure and operating the vehicle based on the driving pattern.

The driving information may include longitudinal acceleration and lateral acceleration collected to a time point of terminating intervention of the driver from a time point of starting intervention of the driver with respect to the vehicle. The generating of the driving pattern may include passing the collected longitudinal acceleration and lateral acceleration through a predetermined filter to remove noise, and calculating a diagram in a closed curve shape that corresponds to a driving tendency of the driver using the longitudinal acceleration and lateral acceleration from which the noise is removed.

The predetermined filter may include at least one of a moving average filter (MAF) or a low pass filter (LPF). The method may further include matching and storing the collected curvature information and a driving pattern corresponding to the calculated diagram. The storing may include classifying the diagram into a plurality of sections based on a change in driving state, and storing a boundary value of the longitudinal acceleration and the lateral acceleration in the plurality of sections.

The plurality of sections may include a deceleration section, a turn section, and an acceleration section. The generating of the driving pattern may include variably adjusting a size of the diagram and the boundary value of the longitudinal acceleration and the lateral acceleration when a curvature of the road is changed. The operating the vehicle may include comparing a measured acceleration collected using a sensor in the vehicle that travels autonomously with a minimum acceleration during deceleration and a maximum acceleration during acceleration, calculated based on the driving pattern, and as a comparison result, when the measured acceleration is less than the minimum acceleration or is greater than the maximum acceleration, deceleration or acceleration of the vehicle may be executed according to the driving pattern.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
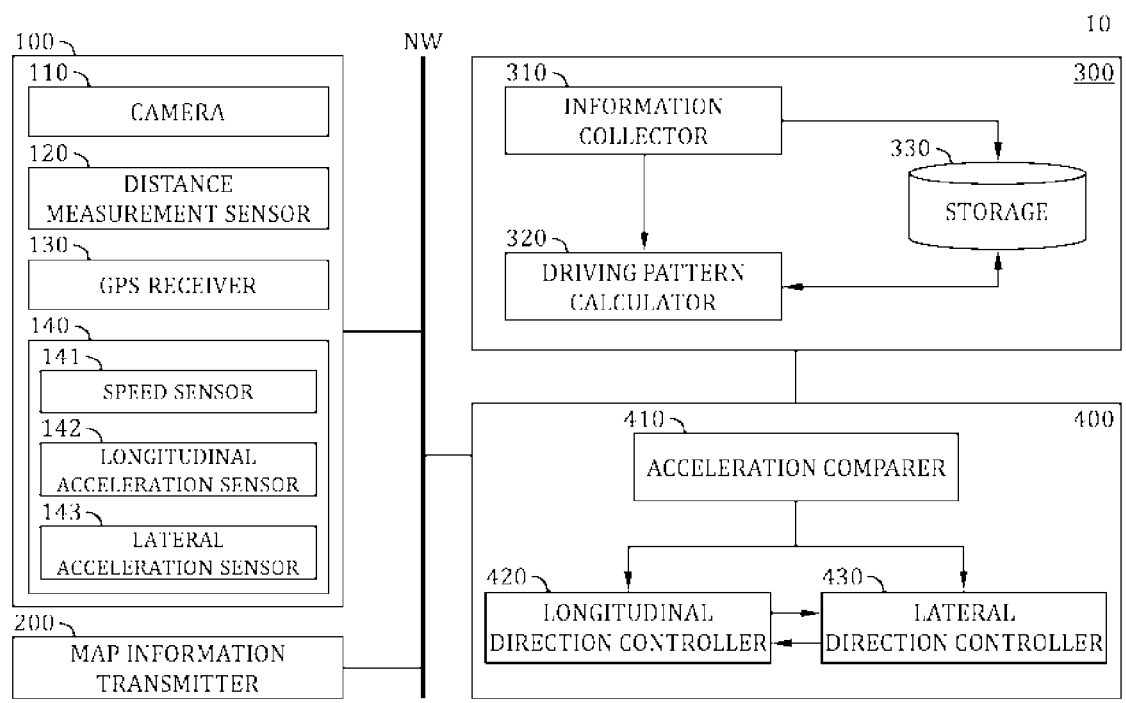
FIG. 1 is a schematic block diagram of an autonomous driving control apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute the modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments will be described in detail with reference to the attached drawings. The exemplary embodiments may, however, be embodied in many alternate forms and the disclosure should not be construed as limited to the exemplary embodiments set forth herein. Accordingly, while the disclosure is susceptible to various modifications and alternative forms, specific exemplary embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the embodiments as defined by the claims.

The terms such as "first" and "second" are used herein merely to describe a variety of constituent elements, but the constituent elements are not limited by the terms. The terms are used only for the purpose of distinguishing one constituent element from another constituent element. In addition, terms defined in consideration of configuration and operation of embodiments are used only for illustrative purposes and are not intended to limit the scope of the embodiments.

The terminology used herein is for the purpose of describing particular exemplary embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an autonomous driving control apparatus according to each exemplary embodiment of the present disclosure will be described with reference to the accompanying drawings.

FIG. 1 is a schematic block diagram of an autonomous driving control apparatus according to an exemplary embodiment of the present disclosure. Referring to FIG. 1, an autonomous driving control apparatus 10 may include a sensor information transmitter 100, a map information transmitter 200, a driver pattern generator 300, and a vehicle controller 400. The terms, such as 'generator' or 'controller', etc., should be understood as a unit that processes (e.g., is specifically programmed to execute) at least one function or operation and that may be embodied in a hardware manner (e.g., one or more processors), a software manner, or a combination of the hardware manner and the software manner.

The sensor information transmitter 100 may be configured to acquire sensor information through various sensors installed inside and/or outside the vehicle, and may include a camera 110, a distance measurement sensor 120, a global positioning system (GPS) receiver 130, and a vehicle sensor 140. The camera 110 may be configured to acquire information regarding an image of a region around a vehicle, captured through an optical system, and perform image processing (e.g., noise removal, image quality and chroma adjustment, or file compression) on the acquired image information to detect a shape of a road ahead of the vehicle.

The camera 110 may also be configured to acquire information regarding an image of a region around a vehicle, captured through an optical system, and perform image processing such as noise removal, image quality and chroma adjustment, or file compression on the acquired image information. The distance measurement sensor 120 may be embodied as a RADAR configured to measure a distance from an object or relative speed using electromagnetic waves and/or a LIDAR for also observing a blind area, which is not recognizable by the RADAR, using light, and may be configured to measure a time during which electromagnetic waves or light emitted to an object is reached to measure a distance between the vehicle and the object.

The GPS receiver 130 may be configured receive a navigation message from at least one GPS satellite and collect current position information of the vehicle in real time. The vehicle sensor 140 may be configured to periodically measure state information of various actuators to collect information on the properties of dynamic driving of the vehicle, and may include a speed sensor 141, a longitudinal G-sensor 142, and a lateral G-sensor 143.

The speed sensor 141 may be configured to detect a driving speed of the vehicle based on an output wave of a wheel speed of the vehicle, which is differentially acquired. The longitudinal G-sensor 142 may be configured to measure acceleration (hereinafter referred to as 'longitudinal acceleration' for convenience of description) which is parallel to a driving direction of the vehicle, and detect longitudinal acceleration that is changed when the vehicle is accelerated or decelerated based on a depth amount of an accelerator pedal or a brake pedal which is manipulated by the driver.

The lateral G-sensor 143 may be configured to measure acceleration (hereinafter referred to as 'lateral acceleration' for convenience of description) which is perpendicular to the driving direction of the vehicle, and detect lateral acceleration applied to the vehicle when vehicle steering is changed right and left. The map information transmitter 200 may be configured to pre-store a high definition map containing road information regarding a shape, a curvature, and lateral inclination of a road, and position information that corresponds to the road information, in the form of a database.

Particularly, the high definition map may include road network data including a node and a link, the node may refer to a point at which the attribute of the road is changed, such as an intersection or a branch, and the link may refer to a connection line that linearly represents a road between nodes. The road network data may include information regarding a lane level defined by previously measuring and digitizing the physical properties (e.g., a width, a curvature, a gradient, or an inclination of each lane) of each lane belonging to a road.

The sensor information transmitter 100 and the map information transmitter 200 may be configured to communicate with the driver pattern generator 300 and/or the vehicle controller 400 via a vehicular network (NW), and in this case, the vehicular network (NW) may include in-vehicle communications such as a controller area network (CAN), a CAN with flexible data rate (CAN-FD), FlexRay, media oriented systems transport (MOST), or time triggered Ethernet (TT Ethernet). The driver pattern generator 300 may be configured to generate a driving pattern defined by associating longitudinal and lateral motions of the vehicle based on driving information of a driver, and may include an information collector 310, a driving pattern calculator 320, and a storage 330.

The information collector 310 may be configured to collect sensor information and/or high definition information, which are transmitted via the vehicular network (NW), in real time, and may be configured to transmit curvature information of a road ahead of the vehicle and driving information of a driver to the driving pattern calculator 320 and the storage 330. In particular, the information collector 310 may be configured to collect a driving speed, longitudinal acceleration, and lateral acceleration of the vehicle over time to a time point of terminating intervention of the driver from a time point of starting intervention of the driver with respect to the vehicle that travels.

The driving pattern calculator 320 may be configured to perform filtering for removing noise (e.g., noise or disturbance) present in the collected longitudinal acceleration and lateral acceleration and may model a diagram that corresponds to a driving tendency of the driver using the filtered longitudinal acceleration and lateral acceleration to calculate a driving pattern. In particular, the diagram is one element used to represent overall longitudinal and lateral motions of the vehicle, and represents the longitudinal acceleration and the lateral acceleration in the form of a closed curve in X-Y coordinates.

The driving pattern calculator 320 may be configured to divide the diagram into a plurality of sections based on a change in a driving state and may be configured to calculate a boundary value for the longitudinal acceleration and/or the lateral acceleration in the plurality of sections.

The storage 330 may be configured to match and store curvature information of the road and information (e.g., a size, a shape, and a boundary value of the diagram) regarding the diagram corresponding to a driving pattern of a driver. The vehicle controller 400 may be configured to set a constraint condition for driving torque and brake pressure based on the generated driving pattern and may adjust vehicle driving, and may include an acceleration comparer 410, a longitudinal direction controller 420, and a lateral direction controller 430. In particular, the constraint condition may be activated as an autonomous driving mode is executed according to a driving pattern through input of a driver.

Further, the acceleration comparer 410 may be configured to compare a measured value of acceleration collected using the acceleration sensors 141 and 143 installed within a vehicle that travels autonomously with minimum and maximum values of the acceleration during deceleration, turning, and acceleration, which are calculated based on the driving pattern. In particular, the acceleration may include longitudinal acceleration and lateral acceleration.

As the comparison result of the acceleration comparer 410, in response to determining that the measured value of the longitudinal acceleration collected using the longitudinal G-sensor 142 is less than the minimum value of the longitudinal acceleration, calculated based on the driving pattern of the driver, or is greater than the maximum value of the longitudinal acceleration, the longitudinal direction controller 420 may be configured to calculate driving torque and/or brake pressure for executing deceleration and/or acceleration of the vehicle based on the longitudinal acceleration corresponding to the driving pattern. The lateral direction controller 430 may be configured to output the lateral acceleration corresponding to the driving pattern, and displacement of a steering angle and steering torque, which are calculated based on the curvature information on the high definition information, to a steering device (not shown) and then adjust the turn of the vehicle.

Figure 2:
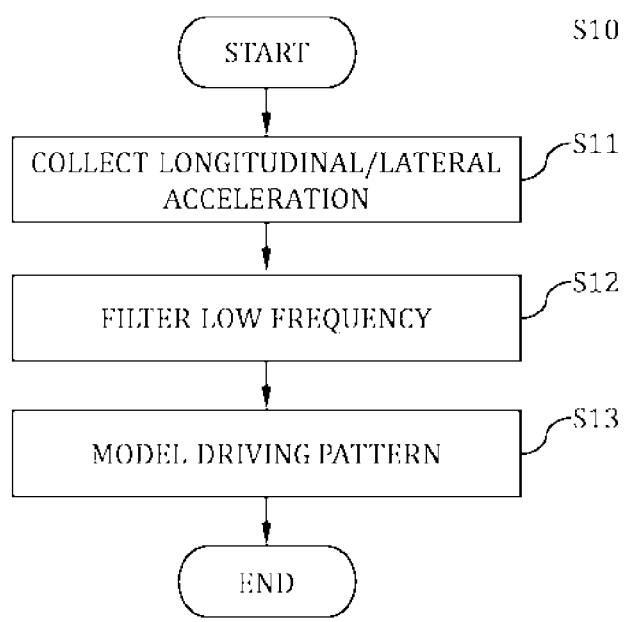
FIG. 2 is a flowchart for explaining a procedure of generating a driving pattern through an autonomous driving control apparatus according to an exemplary embodiment of the present disclosure.

Hereinafter, based on the flowchart of FIG. 2, a method of generating a driving pattern of a driver will be described in more detail with reference to FIGS. 3A to 5. FIG. 2 is a flowchart illustrating a procedure of generating a driving pattern through an autonomous driving control apparatus according to an exemplary embodiment of the present disclosure. The method described herein below may be executed by a controller.

Referring to FIG. 2, operation S10 of generating a driving pattern of a driver may include a longitudinal/lateral acceleration collecting operation S11, a low frequency filtering operation S12, and a driving pattern modeling operation S13. First, the longitudinal G-sensor 142 may be configured to measure longitudinal acceleration ax of the vehicle in real time, and the lateral G-sensor 143 may be configured to measure lateral acceleration ay of the vehicle in real time. The longitudinal acceleration ax and the lateral acceleration ay, measured by the longitudinal G-sensor 142 and the lateral G-sensor 143, respectively, may be collected by the information collector 310 via the vehicular network (NW) (S11).

Figure 3A:
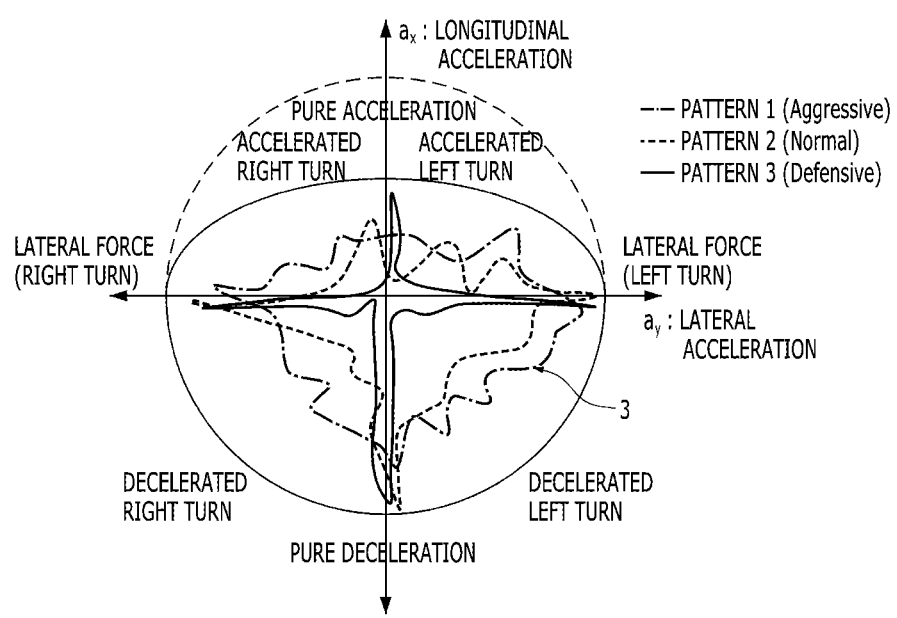
FIG. 3A is a view illustrating a driving pattern of a driver, generated based on raw data of acceleration collected prior to filtering according to an exemplary embodiment of the present disclosure.
Figure 3B:
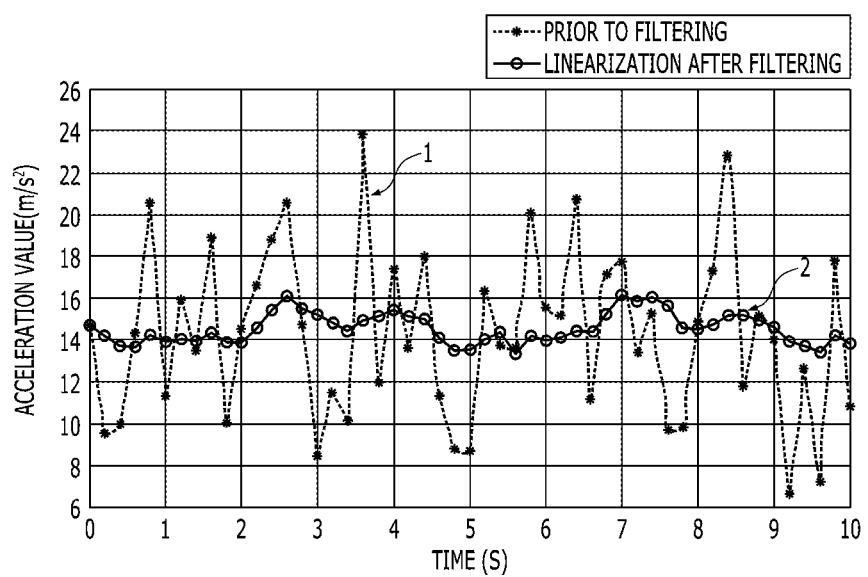
FIG. 3B is a view illustrating a method of filtering raw data of acceleration in a linearized signal wave according to an exemplary embodiment of the present disclosure.

The driving pattern calculator 320 may be configured to perform filtering to remove noise (e.g., noise or disturbance) present in the collected longitudinal acceleration ax and the lateral acceleration ay (S12), which will be described below with reference to FIGS. 3A-3B and 4. FIGS. 3A-3B are views illustrating the low frequency filtering operation S12 of FIG. 2. In particular, FIG. 3A is a view illustrating a driving pattern of a driver, generated based on raw data of acceleration collected prior to filtering, and FIG. 3B is a view illustrating a method of filtering raw data of acceleration in a linearized signal wave.

In the graph of FIG. 3A, the X axis indicates the lateral acceleration ay during a turn, and the Y axis indicates the longitudinal acceleration ax during acceleration and deceleration. Particularly, based on the X axis, an upper side indicates a behavior of a vehicle during acceleration, and a lower side indicates a behavior of a vehicle during deceleration, and based on the Y axis, a left side indicates a behavior of a vehicle during a right turn, and a right side indicates a behavior of a vehicle during left turn. A driving pattern 3 of a driver shown in X-Y coordinates may correspond to a trajectory of an acceleration vector formed by synthesizing raw data of the longitudinal acceleration ax and the lateral acceleration ay.

Referring to FIGS. 3A and 3B, the acceleration sensors 141 and 143 installed within the vehicle may sensitively react according to a dynamic behavior of the vehicle, and raw data 1 of acceleration, collected by the information collector 310 via the vehicular network (NW), may include a noise component due to noise, disturbance, or the like. The noise component may distort the magnitude of acceleration to act as a factor for impeding accurate calculation of the driving pattern 3 of the driver.

In particular, the raw data 1 of acceleration collected prior to filtering may be discretely distributed according to a time flow due to a noise component (refer to FIG. 3B, and based thereon, the generated driving pattern 3 of the driver may have an irregular moving trajectory (refer to FIG. 3A)). Thus, when autonomous driving is performed based on the driving pattern 3 of the driver, shown in FIG. 3A, a passenger who rides in a vehicle has a difficulty in maintaining a correct position and the discomfort of the passenger is increased.

Thus, as shown in FIG. 3B, the driving pattern calculator 320 according to an exemplary embodiment may be configured to remove a noise component of the raw data 1 using a predetermined filter and output a linearized signal wave 2 to correct distortion of the magnitude of acceleration. In particular, the predetermined filter may be at least one of a moving average filter (MAF) or a low pass filter (LPF). The moving average filter (MAF) may be configured to calculate a moving average for each sampling period and filter noise or the like to apply a dynamic variation of the collected raw data 1. The low pass filter (LPF) may be configured to block a noise component in a high frequency band, pass only acceleration in a low frequency band, and perform filtering. The driving pattern calculator 320 may not consider a time delay that occurs when the moving average filter (MAF) and/or the low pass filter (LPF) are applied.

Figure 4:
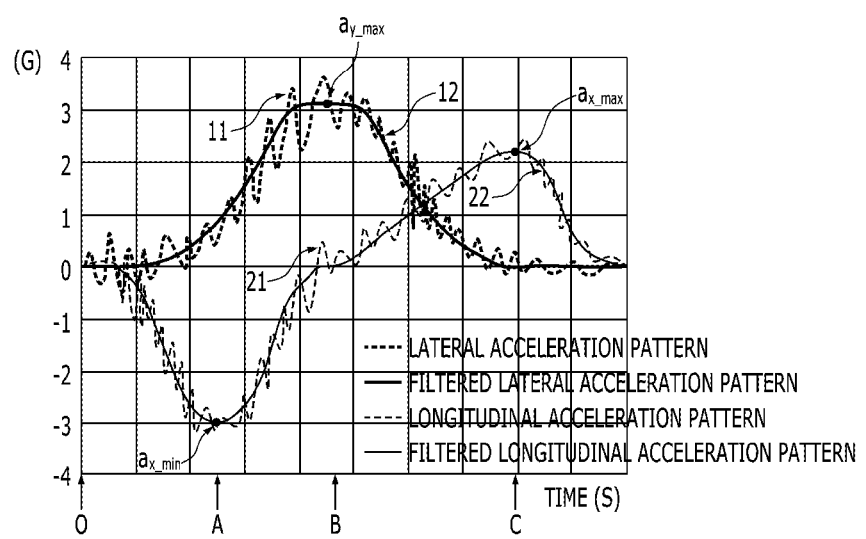
FIG. 4 is a view showing an acceleration pattern that is filtered with respect to each of longitudinal and lateral directions through an autonomous driving control apparatus according to an exemplary embodiment of the present disclosure.

FIG. 4 is a view showing an acceleration pattern that is filtered with respect to each of longitudinal and lateral directions through an autonomous driving control apparatus according to an exemplary embodiment of the present disclosure. Referring to FIG. 4, the driving pattern calculator 320 may be configured to remove noise components included in raw data 11 and 21 of each of the longitudinal acceleration ax and the lateral acceleration ay, which are collected by the information collector 310, and may be configured to generate linearized acceleration signal waves 12 and 22. In particular, in the graph of FIG. 4, the X axis indicates a time, the Y axis indicates acceleration, and the acceleration may be presented in units of gravitational forces (G-forces).

The driving pattern calculator 320 may be configured to pass the raw data 11 of the lateral acceleration ay collected using the lateral G-sensor 143 through the aforementioned filter and output the lateral acceleration signal wave 12 from which noise is removed. In addition, the driving pattern calculator 320 may be configured to pass the raw data 21 of the longitudinal acceleration ax collected using the longitudinal G-sensor 142 through the aforementioned filter and output the longitudinal acceleration signal wave 22 from which noise is removed.

Further, the driving pattern calculator 320 may be configured to divide the output acceleration signal waves 11 and 12 into a plurality of sections according to a change in driving state, and may be configured to calculate a boundary value of the longitudinal acceleration ax and/or the lateral acceleration ay in the plurality of sections. Particularly, the plurality of sections may be classified into a deceleration section O-A, a turn section A-B, and an acceleration section B-C based on points A, B, and C at which a control state of the vehicle changes. For example, point A may correspond to a point for entry into a curved road, point B may correspond to a maximum curvature point of the curved road, point C may correspond to a point for deviating from the curved road, and point O may correspond to the current position of the vehicle. The boundary value may include a minimum value ax_min of longitudinal acceleration in the deceleration section O-A, a maximum value ay_max of lateral acceleration in the turn section A-B, and a maximum value ax_max of longitudinal acceleration in the acceleration section B-C.

Figure 5:
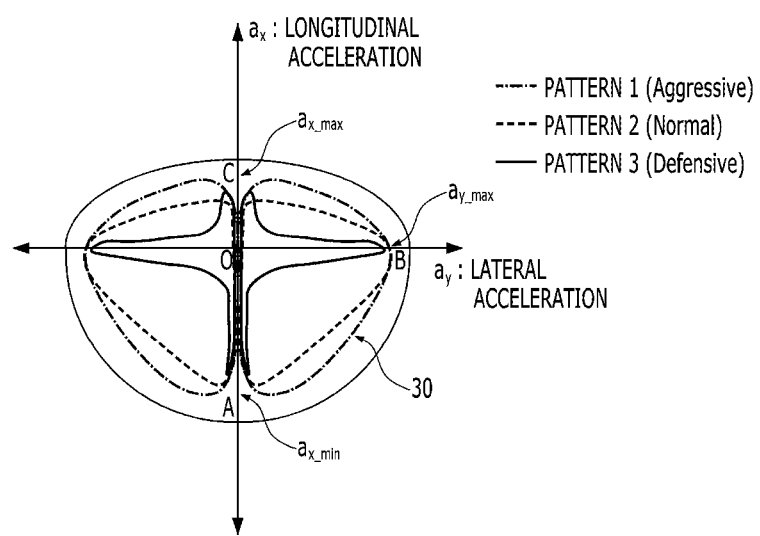
FIG. 5 is a view for explaining the driving pattern modeling operation S13 of FIG. 2 according to an exemplary embodiment of the present disclosure.

Referring back to FIG. 2, the driving pattern calculator 320 may be configured to model the diagram corresponding to the driving tendency of the driver based on the longitudinal acceleration and the lateral acceleration that are passed and output through the aforementioned filter (S13), which will be described below with reference to FIG. 5. FIG. 5 is a view illustrating the driving pattern modeling operation S13 of FIG. 2. In the graph of FIG. 5, the attributes of the X and Y axes are the same as those in FIG. 3A, and thus a repeated description thereof will be omitted.

Referring to FIG. 5, the driving pattern calculator 320 may be configured to calculate a diagram 30 in a closed curve shape that corresponds to a driving tendency of the driver in X-Y coordinates based on the longitudinal acceleration ax and the lateral acceleration ay from which noise is removed. The diagram 30 is one element used to represent overall longitudinal and lateral motions of the vehicle that is being driven on the curved road and may correspond to the driving pattern of the driver.

For example, the driving pattern calculator 320 may be configured to repeatedly input the lateral acceleration signal wave 12 and the longitudinal acceleration signal wave 22 shown in FIG. 4 to the X and Y axes of an oscilloscope, respectively until a complete Lissajous figure is output, and thus the diagram 30 in a closed curve shape may be generated. In particular, the Lissajous figure may refer to a distinguishing pattern that is represented based a phase difference between two different signals input to the X and Y axes, a frequency ratio, or the like.

The diagram 30 may be generated in patterns with various shapes according to the driving tendency on a predetermined curved road may be broadly classified into aggressive, normal, or defensive pattern, and the driving pattern calculator 320 may be configured to calculate a closed curve in a round, rhombus, or cross shape based on a safe margin of a driver, which occurs between the entry point A and the deviation point C of the curved road. In other words, according to a behavior pattern of a driver who attempts cornering on the curved road, the aggressive driving tendency may be modeled in 'pattern 1' in a rounded shape indicated by a dashed dotted line, the normal driving tendency may be modeled in 'pattern 2' in a rhombus shape indicated by a dotted line, and the defensive driving tendency may be modeled in 'pattern 3' in a cross shape indicated by a solid line.

The storage 330 may be configured to match curvature information of a corresponding road and property information of a driving pattern of a driver, and store and manage the result as shown in Table 1 below.

TABLE 1

| Division | Position | Road Curvature | Driving speed | Pattern shape (Driving pattern) | Boundary Value ($a_{x\_min}$, $a_{y\_max}$, $a_{x\_max}$) |
|---|---|---|---|---|---|
| 'Pattern 1' | $P_1$ | $r_1$ | $V_1$ | round (Aggressive) | ($a_{11}$, $a_{12}$, $a_{13}$) |
| 'Pattern 2' | $P_2$ | $r_2$ | $V_2$ | rhombus (Normal) | ($a_{21}$, $a_{22}$, $a_{23}$) |
| 'Pattern 3' | $P_3$ | $r_3$ | $V_3$ | cross (Defensive) | ($a_{31}$, $a_{32}$, $a_{33}$) |

Referring to Table 1 above, when a curved road with a predetermined curvature is detected ahead of a vehicle using the camera 110, the storage 330 may be configured to store road information received through the information collector 310, e.g., a position P on the high definition map of the curved road, a curvature r of the corresponding road, and a driving speed V of the vehicle prior to entry into the curved road, and property information of a driving pattern of the driver, calculated by the driving pattern calculator 320, e.g., a shape of the driving pattern, a driving tendency of a driver, a driving pattern of the driver, and boundary values ax_min, ay_max, and ax_max, in the form of a database DB. In particular, the storage 330 may be configured to classify and manage the stored information based on the road curvature or the driving tendency of the driver.

The storage 330 may be embodied as one or more of storages such as a flash memory, a hard disk, a secure digital (SD) card, a random access memory (RAM), a read only memory (ROM), or web storage. The driving pattern calculator 320 may be configured to read property information of a road and a driving pattern, which are pre-stored in the storage 330, and re-calculate the driving pattern of the driver. The driving pattern calculator 320 may be configured to variably adjust the size and the boundary values ax_min, ay_max, and ax_max of the diagram 30 and re-calculate the driving pattern of the driver through a ratio between the curvature information collected from the information collector 310 and the curvature information pre-stored in the storage 330. The driving pattern calculator 320 may be configured to set a curvature ratio α of a road as a tuning coefficient, but the scope of the present disclosure is not limited thereto.

For example, assuming that a curved road having a curvature value of r4 ahead of a vehicle is detected using the information collector 310 while an autonomous driving mode according to the aggressive driving pattern by driver is input, the driving pattern calculator 320 may be configured to read information on 'pattern 1' pre-stored in the storage 330 (refer to Table 1) and re-calculate a driving pattern of the driver to increase or decrease the size and the boundary values a11, a12, and a13 in proportion to the road curvature ratio α=r4/r1. The overall shape (or a driving tendency of the driver) of the diagram 30 may be maintained without changes.

Even when a driving pattern for a specific curved road is pre-stored in the storage 330, the driving pattern calculator 320 may be configured to update the stored driving pattern according to driver selection. The driving pattern calculator 320 may be configured to generate a closed curve corrected by calculating an average between a closed curve generated based on a behavior pattern of a driver, which is newly collected using the information collector 310, and a closed curve pre-stored in the storage 330, and may be configured to update the driving pattern of the driver to a diagram in the corrected close curve shape. In particular, the storage 330 may be configured to perform initialization by deleting the pre-stored closed curve and set the corrected close curve to a default value, and thus, may be configured to maintain or change an overall shape of the diagram 30. For example, as the driving pattern is updated, the aggressive or defensive driving tendency may be changed to the normal driving tendency.

As described above, the driver pattern generator 300 may be configured to propose a diagram defined by associating behaviors in longitudinal and lateral directions as a factor and may provide a similar driving pattern to a usual driving habit of the driver to the vehicle. In other words, a qualitative driving habit of a driver who 'toughly' or 'smoothly' drives the vehicle may be quantitatively recorded through a diagram and may be applied to autonomous driving, and thus, a driver customized autonomous driving may be enabled outside a uniform driving pattern, and a sense of unfamiliarity between actual driving by the driver and autonomous driving may be reduced.

In particular, acceleration in longitudinal and lateral directions on a curved road may be maintained according to a normal driving habit of the driver by changing the diagram, and thus, the discomfort of the passenger who rides in an autonomous vehicle may be minimized. The driver may be configured to autonomously select various driving patterns from conservative management to aggressive management based on driving tendencies based on quantitative data, and thus, stability and economics with respect to vehicle motion may be simultaneously considered when a vehicle is being driven.

Figure 6:
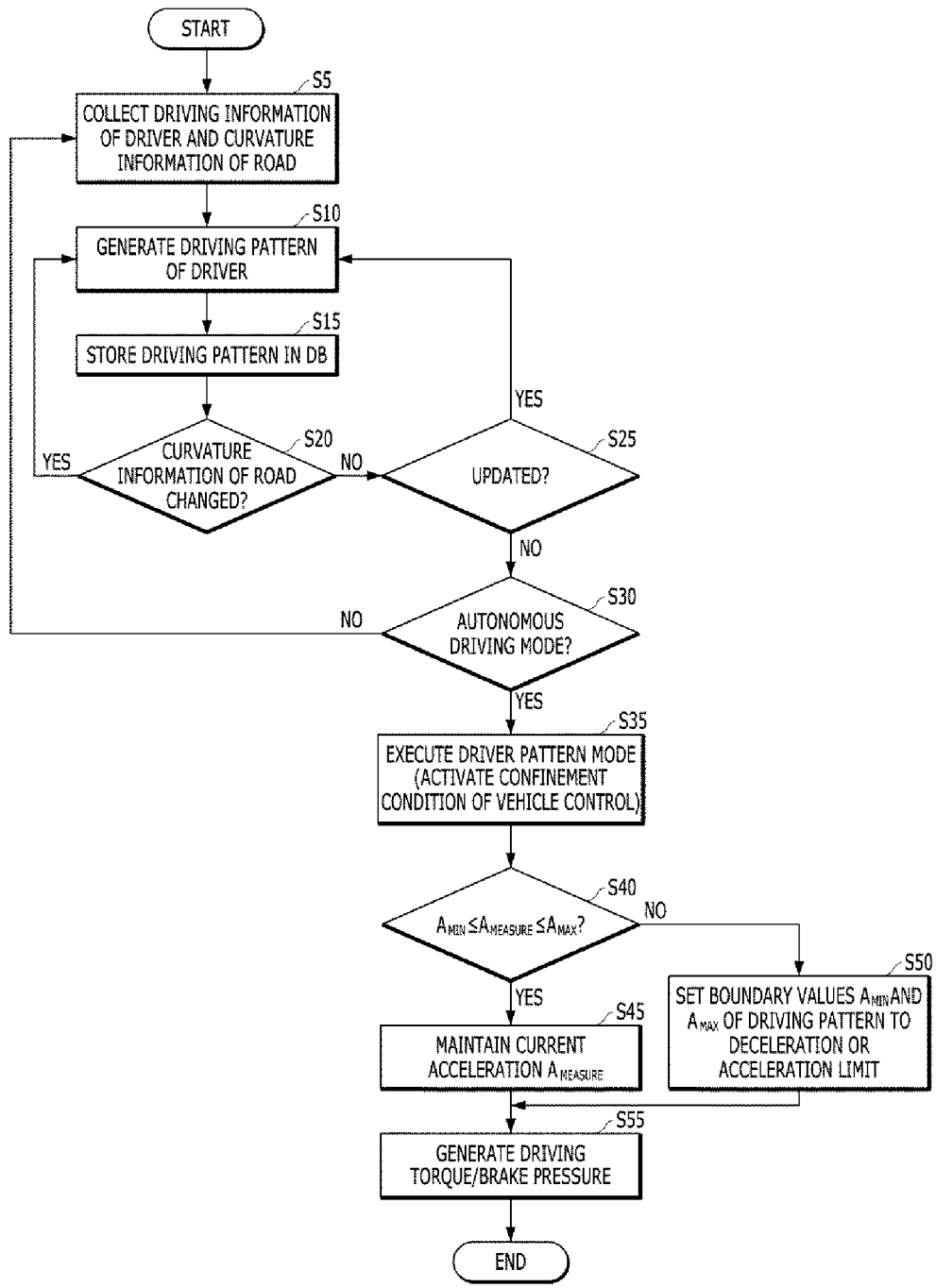
FIG. 6 is a flowchart for explaining a method of controlling autonomous driving according to an exemplary embodiment of the present disclosure.

Hereinafter, an autonomous driving method of a vehicle based on the aforementioned driving pattern will be described with reference to FIG. 6. FIG. 6 is a flowchart illustrating a method of controlling autonomous driving according to an exemplary embodiment of the present disclosure.

First, the driver pattern generator 300 may be configured to collect driving information of a driver and curvature information of a road positioned ahead of the vehicle (S5). In particular, the driving information of the driver may include a driving speed, longitudinal acceleration, and lateral acceleration of the vehicle over time to a time point of terminating intervention of the driver from a time point of starting intervention of the driver with respect to the vehicle.

Then, the driver pattern generator 300 may be configured to perform filtering to remove noise components present in the collected longitudinal and lateral accelerations, and may model a diagram in a closed curve that corresponds to a driving tendency of the driver using the filtered longitudinal acceleration and lateral acceleration to calculate a driving pattern (S10). Particularly, the driving pattern may be modeled to a diagram in a round, rhombus, or cross shape according to the driving tendency of the driver, and a detailed description thereof has been described above with reference to FIGS. 2 to 5, and thus, a repeated description will be omitted for avoiding redundancy.

The driver pattern generator 300 may be configured to match curvature information of a road and information (e.g., a size, shape, and boundary value of the diagram) on a diagram that corresponds to a driving pattern of a driver, and may be configured to store the result in a database (DB) (S15). The size and shape of the diagram may be changed based on a driving tendency of the driver, and the boundary value may refer to minimum and maximum values of longitudinal and lateral acceleration in each section (e.g., deceleration, turning, and acceleration sections) classified according to a driving state. Further, the driver pattern generator 300 may be configured to determine whether a change between the curvature information stored in the DB and newly collected curvature information occurs (S20).

In response to determining that the curvature information of the road is changed (YES of S20), the driver pattern generator 300 may be configured to read information regarding the driving pattern stored in the DB and re-calculate the driving pattern of the driver. The driver pattern generator 300 may be configured to set a curvature ratio α of a road as a tuning coefficient and variably adjust the size and the boundary values of the longitudinal and lateral acceleration, stored in the DB, to be increased and decreased.

In contrast, in response to determining that the curvature information of the road is not changed (NO of S20), the driver pattern generator 300 may be configured to determine whether the driving pattern store in the DB is updated based on driver selection (S25). In response to receiving a user or driver a request for updating of a driving pattern (YES of S25), the driver pattern generator 300 may be configured to generate a closed curve corrected by calculating an average between a closed curve generated based on a behavior pattern of a driver, which is newly collected, and a closed curve pre-stored in the DB, and may be configured to update the driving pattern of the driver to a diagram in the corrected close curve shape.

Additionally, the driver pattern generator 300 may then be configured to transmit the driving pattern, which is stored in the DB, is recalculated, or updated, to the vehicle controller 400, and the vehicle controller 400 may be configured to determine whether a current driving mode of a vehicle is an autonomous driving mode (S30). In response to determining that the current driving mode is an autonomous driving mode (NO of S30), the method may return to operation S5, and driving information of the driver and curvature information of the road may be continuously collected through a manual driving mode. In contrast, in response to determining that the current driving mode is determined to be an autonomous driving mode (YES of S30), the vehicle controller 400 may be configured to execute a driver pattern mode to activate the driving pattern to a constraint condition of vehicle control (S35).

In particular, the vehicle controller 400 may be configured to compare a measured value 'ameasure' of acceleration collected using the acceleration sensors 141 and 143 installed within a vehicle with a minimum value 'amin' and a maximum value 'amax' of the acceleration during deceleration, turning, and acceleration, which are calculated based on the driving pattern (S40). The acceleration may include longitudinal acceleration and lateral acceleration.

In response to determining that the measured value 'ameasure' of acceleration through the acceleration sensors 141 and 143 corresponds to a range equal to or greater than the minimum value 'amin' of the acceleration calculated by the driver pattern generator 300 and equal to or greater than the maximum value 'amax' (YES of S40), while the measured value 'ameasure' of the current acceleration is maintained without changes (S45), driving torque and/or brake pressure for executing deceleration and/or acceleration of the vehicle may be calculated (S55).

In contrast, in response to determining that the measured value 'measure' of acceleration using the acceleration sensors 141 and 143 is less than the minimum value 'amin' of the acceleration calculated by the driver pattern generator 300 or greater than the maximum value 'amax' (NO of S40), boundary values ax_min, ay_max, and ax_max of the driving pattern may be set to a deceleration or acceleration limit of the vehicle (S50), and corresponding driving torque and/or brake pressure may be calculated to execute autonomous driving of the vehicle according to the trajectory of the driving pattern shown in FIG. 5 (S55).

As a result, the driving pattern calculated by the driver pattern generator 300 may be set to a constraint condition for deceleration and acceleration of an autonomous driving vehicle, and the vehicle controller 400 may be configured to execute autonomous driving of the vehicle within a range that does not exceed a range of longitudinal and lateral acceleration of the driving pattern stored in the DB during deceleration, turning, and acceleration of the curved road.

In accordance with another aspect of the present disclosure, the driver pattern generator 300 and the vehicle controller 400 may refer to a hardware device that includes one or more processors to execute instructions to perform all or part of the steps in the above described methods. The instructions executed by the one or more processors may include collecting driving information of a driver and curvature information of a road: generating a driving pattern of the driver, defined by associating behaviors in longitudinal and lateral directions of the vehicle based on the driving information; and setting the driving pattern to a constraint condition for driving torque and brake pressure and operating the vehicle.

According to at least one exemplary embodiment of the present disclosure, a diagram defined by associating behaviors in longitudinal and lateral directions may be proposed as a factor to provide a similar driving pattern to a usual driving habit of the driver to the vehicle. Thus, a qualitative driving habit of a driver who 'toughly' or 'smoothly' drives the vehicle may be quantitatively recorded through a diagram and may be applied to autonomous driving, and thus, a driver customized autonomous driving may be enabled outside a uniform driving pattern, and a sense of unfamiliarity between actual driving by the driver and autonomous driving may be reduced.

In addition, the driver may autonomously select various driving patterns from conservative management to aggressive management according to driving tendencies based on quantitative data, and thus, stability and economics with respect to vehicle motion may be simultaneously considered when a vehicle travels.

It will be appreciated by persons skilled in the art that that the effects that could be achieved with the present disclosure are not limited to what has been particularly described hereinabove and other advantages of the present disclosure will be more clearly understood from the detailed description.

The method of controlling autonomous driving according to an exemplary embodiment described above may be programmed to be executed in a computer and may be stored on a non-transitory computer readable recording medium. Examples of the non-transitory computer readable recording medium include read-only memory (ROM), random-access memory (RAM), CD-ROMs, magnetic tapes, floppy disks, optical data storage devices, etc.

The non-transitory computer readable recording medium may also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

Although only several exemplary embodiments have been described above, various other embodiments are possible. The technical ideas of the exemplary embodiments described above may be combined into various forms unless they are incompatible techniques, and thereby new exemplary embodiments may be realized.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of controlling autonomous driving, comprising:
   collecting, by one or more processors, driving information of a driver and a road information from a high-definition map;
   generating, by the one or more processors, a driving pattern of the driver, defined by associating behaviors in longitudinal and lateral directions of the vehicle based on the driving information; and
   setting, by the one or more processors, the driving pattern to a constraint condition for driving torque and brake pressure and operating the vehicle based on the driving pattern,
   wherein the driving information includes longitudinal acceleration and lateral acceleration that are collected to a time point of terminating intervention of the driver from a time point of starting intervention of the driver with respect to the vehicle,
wherein the generating of the driving pattern includes:
   passing, by the one or more processors, the collected longitudinal acceleration and lateral acceleration through a predetermined filter to remove noise; and
   calculating, by the one or more processors, a diagram in a closed curve shape that corresponds to a driving tendency of the driver using the longitudinal acceleration and lateral acceleration from which the noise is removed,
   wherein the closed curve shape includes a rounded shape, a rhombus shape, and cross shapes, and
   modeling an aggressive driving tendency, a normal driving tendency and a defensive driving tendency in the round shape, the rhombus shape and the cross shape, respectively, based on a safe margin of the driver, which occurs between an entry point into a curved road and a deviation point from the curved road; and
   wherein the road information includes a shape, a curvature, and lateral inclination of the curved road.

2. The method of claim 1, wherein the predetermined filter includes at least one of a moving average filter (MAF) or a low pass filter (LPF).

3. The method of claim 1, further comprising matching and storing, by the one or more processors, the collected curvature information and a driving pattern corresponding to the calculated diagram.

4. The method of claim 3, wherein the storing includes:
   classifying, by the one or more processors, the diagram into a plurality of sections according to a change in driving state; and
   storing, by the one or more processors, a boundary value of the longitudinal acceleration and the lateral acceleration in the plurality of sections.

5. The method of claim 4, wherein the plurality of sections include a deceleration section, a turn section, and an acceleration section.

6. The method of claim 4, wherein the generating of the driving pattern includes variably adjusting, by the one or more processors, a size of the diagram and the boundary value of the longitudinal acceleration and the lateral acceleration when a curvature of the road is changed.

7. The method of claim 1, wherein the operating of the vehicle includes:
   comparing, by the one or more processors, a measured acceleration collected using a sensor in the vehicle that autonomously travels with a minimum acceleration during deceleration and a maximum acceleration during acceleration, calculated based on the driving pattern; and
   wherein, as a comparison result, in response to determining that the measured acceleration is less than the minimum acceleration or is greater than the maximum acceleration, executing, by the one or more processors, deceleration or acceleration of the vehicle according to the driving pattern.

8. A non-transitory computer readable recording medium having recorded thereon an application program for executing the method of claim 1 by execution of a processor.

9. An autonomous driving control apparatus, comprising:
   a driver pattern generator configured to collect driving information of a driver and road information from a high definition map, and to generate a driving pattern of the driver, defined by associating behaviors in longitudinal and lateral directions of the vehicle based on the driving information; and
   a vehicle controller configured to set the driving pattern to a constraint condition for driving torque and brake pressure and to operate the vehicle based on the driving pattern,
   wherein the driving information includes longitudinal acceleration and lateral acceleration that are collected to a time point of terminating intervention of the driver from a time point of starting intervention of the driver with respect to the vehicle,
wherein the driver pattern generator includes a driving pattern calculator configured to:
   pass the collected longitudinal acceleration and lateral acceleration through a predetermined filter to remove noise; and calculate a diagram in a closed curve shape that corresponds to a driving tendency of the driver using the longitudinal acceleration and lateral acceleration from which the noise is removed,
wherein the closed curve shape includes a rounded shape, a rhombus shape, and cross shapes, and
model an aggressive driving tendency, a normal driving tendency and a defensive driving tendency in the round shape, the rhombus shape and the cross shape, respectively, based on a safe margin of the driver, which occurs between an entry point into a curved road and a deviation point from the curved road; and
wherein the road information includes a shape, a curvature, and lateral inclination of the curved road.

10. The autonomous driving control apparatus of claim 9, wherein the predetermined filter includes at least one of a moving average filter (MAF) and a low pass filter (LPF).

11. The autonomous driving control apparatus of claim 9, wherein the driver pattern generator includes a storage configured to match and store the collected curvature information and a driving pattern that corresponds to the calculated diagram.

12. The autonomous driving control apparatus of claim 11, wherein the storage classifies the diagram into a plurality of sections according to a change in driving state, and is configured to store a boundary value of the longitudinal acceleration and the lateral acceleration in the plurality of sections.

13. The autonomous driving control apparatus of claim 12, wherein the plurality of sections include a deceleration section, a turn section, and an acceleration section.

14. The autonomous driving control apparatus of claim 12, wherein the driving pattern calculator is configured to variably adjust a size of the diagram and the boundary value of the longitudinal acceleration and the lateral acceleration when a curvature of the road is changed.

15. The autonomous driving control apparatus of claim 9, wherein the vehicle controller includes:
a comparer configure to compare a measured acceleration collected using a sensor in the vehicle that travels autonomously with a minimum acceleration during deceleration and a maximum acceleration during acceleration, calculated based on the driving pattern; and
wherein, as a comparison result, in response to determining that the measured acceleration is less than the minimum acceleration or is greater than the maximum acceleration, deceleration or acceleration of the vehicle is executed according to the driving pattern.

* * * * *